Feb. 13, 1923.
L. G. NILSON.
BRAKE MECHANISM.
FILED NOV. 8, 1920.
1,445,232.
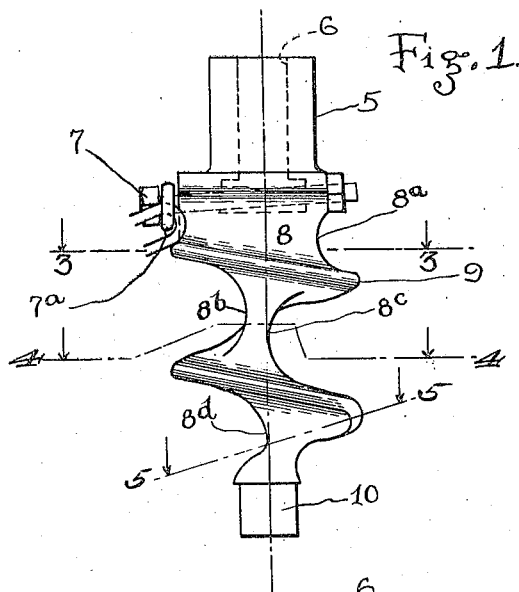
Fig. 1.
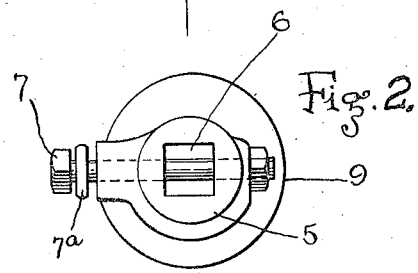
Fig. 2.
Fig. 3.
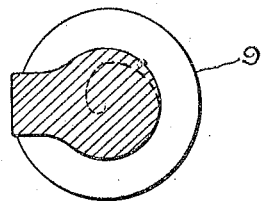
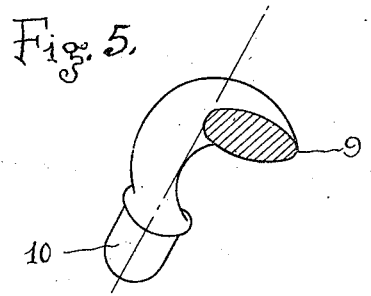
Fig. 5.
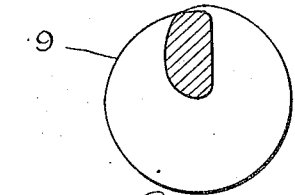
Fig. 4.
Inventor
Lars G. Nilson
By his Attorney Patented Feb. 13, 1923.

1,445,232

UNITED STATES PATENT OFFICE.

LARS G. NILSON, OF HOBOKEN, NEW JERSEY, ASSIGNOR OF ONE-FOURTH TO FRANK P. FAHY, OF NEW YORK, N. Y.

BRAKE MECHANISM.

Application filed November 8, 1920. Serial No. 422,599.

*To all whom it may concern:*

Be it known that I, LARS G. NILSON, citizen of the United States, and resident of Hoboken, in the county of Hudson and State of New Jersey, have invented certain new and useful Improvements in Brake Mechanism, of which the following is a specification.

This invention relates to brake operating mechanism, and my improvement is directed to the use of a volute staff upon which to wind the chain which connects to (or operates) the general brake rigging, whereby the brake-shoes are drawn against the wheels, to thereby permit the exercise of maximum leverage in the operation of the brake.

In the drawing:

Fig. 1 is an elevation of my improved brake operating mechanism.

Fig. 2 is a top plan view thereof.

Fig. 3 is a section on the line 3—3 of Fig. 1.

Fig. 4 is a section on the line 4—4 of Fig. 1, and

Fig. 5 is a section on the line 5—5 of Fig. 1.

Inasmuch as the shafts and chains for brake mechanism must be of substantial dimensions, and it being impractical to have very large winding wheels, the amount of pull that can be produced by hand power is rather limited.

Therefore the present practice is that when more power is needed, gearing is applied—for the purpose of increasing the leverage. This of course means a heavier, more expensive and complicated mechanism.

With the above in mind, I have invented a chain winding device which is of light weight, cheap to manufacture, extremely simple and still more efficient than the winding mechanisms in use today.

My winding mechanism may be made integral with the operating shaft, but for application to old installations at least the form shown in Figs. 1 and 2 will be found most practical.

The upper portion consists of a hub 5 with a suitable hole 6 for receiving the operating shaft. In the figures this hole is shown square for the purpose of receiving a square shaft, but it is to be understood that any other suitable method of coupling can be used. The outside of hub 5 should preferably be round and smooth so that it can rest in a bearing or guide saddle if desired.

Directly below hub 5 is an enlarged portion provided with a bolt 7 intended to receive the first link of a winding chain 7ª. Close to the head of this bolt 7 the chain receiving groove 8 is started, said groove continuing in volute form as indicated at 8ª, 8ᵇ, 8ᶜ and 8ᵈ.

A line drawn in the base of this groove would be a combination of an irregular spiral and a helix, (though for convenience I prefer to designate said groove as being volute), the radius of said groove being the greatest at the bolt, for the purpose of rapidly taking up the slack, and the radius gradually diminishing until it becomes zero at the point 8ᶜ, whence it continues to the end without increase, thus enabling the brake-shoes to be applied to the wheels with great leverage.

The necessary structural strength is provided in the device by making the flange or web 9 which separates the different turns of the groove sufficient in radial extent. This flange terminates in an axial pin 10 that is intended for a bottom bracket bearing.

My improved winding mechanism should not be confused with the winding drum of the ordinary geared brake. The efficiency of my brake mechanism is assured by the elimination of unnecessary parts, thus reducing friction and further by causing the reduction of the radius of the winding groove to zero, which is physically impossible of attainment with the ordinary shaft or drum devices.

It will be apparent that while the volute groove is here shown as having its base diminishing to a point where it lies approximately in the vertical axis of the staff, to thus be of zero or nearly zero radius, said base may, on the principle of the corckscrew, within the limits of structural strength requirements, even have minus radial relation to the said axis, the whole purpose of the invention being to achieve in the winding of the chain upon the staff a maximum degree of leverage while turning the staff to wind the chain thereon.

Also it will be apparent that the web or flange 9 must be designed to have such radial extent as to afford therein sufficient substance to compensate for the diminished radial seat that occurs between the gaps of said web, to accord to the structure ample strength for withstanding the strains imposed thereupon in the operation of the staff.

While I have described my invention as applied to brake operating mechanism and have designated the connecting element between the staff and rigging for the shoes as a chain, I do not wish to be limited thereby, being aware that the device is equally applicable with other than brake mechanism and also that a flexible power member other than a chain may be employed.

Variations may be resorted to within the spirit and scope of my invention comprehended herein.

I claim:—

1. A volute staff having an approximately zero effective winding radius to receive the turns of a flexible power member.

2. A volute staff the radius of whose seat for co-action with the turns of a brake-chain is approximately zero.

3. A flanged volute staff having a seat whose radius for co-action with the turns of a flexible member is approximately zero and the dimensions of whose flange is proportional to the stresses imposed thereon under operation.

4. The combination with brake operating mechanism including a chain of a volute staff whose turns comprise a chain-winding seat lying approximately in the axis of said staff.

5. The combination with a brake operating mechanism including a flexible member of a volute staff having a flange, the turns of said staff comprising a seat lying near the axis of said staff to receive said flexible member, and the dimensions of said flange being proportional to the stresses imposed thereon under operation.

6. A flanged volute staff having a seat whose radius over a part of its length for co-action with the turns of a flexible member is approximately zero, and the dimensions of whose flange are proportional to the stresses imposed thereon, under operation.

7. The combination with brake operating mechanism including a chain of a volute staff having a portion of relatively large diameter and a continuing portion whose turns comprise a chain winding seat lying approximately in the axis of said staff.

8. A volute staff having a virtual winding seat of such small radius as to require external support therefor, and a flange serving as such support.

Signed at borough of Manhattan, in the city, county and State of New York, this 1st day of November, A. D. 1920.

LARS G. NILSON.